US009141181B2

(12) United States Patent
Starr

(10) Patent No.: US 9,141,181 B2
(45) Date of Patent: Sep. 22, 2015

(54) LOW POWER EVENT PROCESSING FOR SENSOR CONTROLLERS

(71) Applicant: Jeffrey W. Starr, Albuquerque, NM (US)

(72) Inventor: Jeffrey W. Starr, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 443 days.

(21) Appl. No.: 13/627,826

(22) Filed: Sep. 26, 2012

(65) Prior Publication Data

US 2014/0089703 A1    Mar. 27, 2014

(51) Int. Cl.
| | |
|---|---|
| *G06F 1/00* | (2006.01) |
| *G06F 13/24* | (2006.01) |
| *G06F 15/16* | (2006.01) |
| *G06N 5/02* | (2006.01) |
| *G05B 15/00* | (2006.01) |
| *G05B 19/18* | (2006.01) |
| *G05B 11/01* | (2006.01) |
| *G06F 1/32* | (2006.01) |
| *G06F 9/48* | (2006.01) |
| *G06F 15/163* | (2006.01) |
| *G05B 15/02* | (2006.01) |
| *G06F 11/30* | (2006.01) |

(52) U.S. Cl.
CPC ............ *G06F 1/3293* (2013.01); *G06F 1/3206* (2013.01); *G06F 1/3209* (2013.01); *G06F 9/4812* (2013.01); *G05B 15/02* (2013.01); *G06F 11/3089* (2013.01); *G06F 13/24* (2013.01); *G06F 15/163* (2013.01); *G06N 5/025* (2013.01); *Y02B 60/121* (2013.01)

(58) Field of Classification Search
None
See application file for complete search history.

(56) References Cited

U.S. PATENT DOCUMENTS

| | | | | |
|---|---|---|---|---|
| 7,231,531 | B2 * | 6/2007 | Cupps et al. ................... | 713/322 |
| 2005/0066209 | A1 * | 3/2005 | Kee et al. ....................... | 713/323 |
| 2010/0064154 | A1 * | 3/2010 | King .............................. | 713/320 |
| 2011/0080367 | A1 * | 4/2011 | Marchand et al. ............. | 345/174 |
| 2012/0186774 | A1 * | 7/2012 | Matsuoka et al. ............ | 165/11.1 |
| 2013/0318380 | A1 * | 11/2013 | Behrens et al. ................ | 713/323 |

* cited by examiner

*Primary Examiner* — Ji H Bae
(74) *Attorney, Agent, or Firm* — Schwegman Lundberg & Woessner, P.A.

(57) ABSTRACT

A controller includes a low power processor to couple to a sensor, the low power processor configured to receive data from the sensor and apply rules to the received data and provide an interrupt in accordance with the applied rules. A high power processor is coupled to receive interrupts from the low power processor in a sleep mode, to wake upon receipt of the interrupt, and to receive and process the data to determine actions to take based on the data, wherein the high power processor initiates the actions.

20 Claims, 3 Drawing Sheets

LOW POWER EVENT PROCESSING FOR SENSOR CONTROLLERS

BACKGROUND

Unattended sensor systems are routinely deployed to collect readings when it is not economical or safe to deploy humans. For example, geologists may deploy sensors on an active volcano to record seismic and temperature readings. Police forces deploy sensors to detect movement through an intersection during a red-light. Security forces use sensors to detect movement into 'no go' zones.

These sensor systems are collecting data continuously (or near continuously) but only rarely need to take an action. For example, a seismic sensor may record activity constantly, but only if the vibration exceed a threshold will the system send out an alert. Furthermore, these sensor systems are often deployed in areas without access to the power grid and are thus 'power limited.' In these cases, there is a requirement to limit power consumption during routine data collection, but a need to take complex action if a threshold is met.

SUMMARY

A controller includes a low power processor to couple to a sensor, the low power processor configured to receive data from the sensor and apply rules to the received data and provide an interrupt in accordance with the applied rules. A high power processor is coupled to receive interrupts from the low power processor in a sleep mode, to wake upon receipt of the interrupt, and to receive and process the data to determine actions to take based on the data, wherein the high power processor initiates the actions.

A method includes receiving triggers at a low power processor in a sensor controller, applying rules via the low power processor to the triggers to determine whether or not to wake a sleeping high power processor, receiving an interrupt from the low power processor at a high power processor in the sensor controller, the interrupt being sent in accordance with the rules, and taking an action in accordance with the rules via the high power processor, wherein the high power processor wakes upon receipt of the interrupt and further processes the rules to take the action. The method may be implemented as programming on a computer readable storage device in further embodiments.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Some definitions:

1) Trigger—an event, usually raised by a sensor, that something interesting has happened. For example, a road-side seismic sensor may send a trigger when a vibration matching a vehicle is detected.

2) Rule—a statement that on a condition, do an action. Broadly, an if-then statement. Conditions may involve many factors.

3) Schedule—a subset of a rule, a schedule is a statement that 'at this time' or 'after this time' do an action.

4) Action—an activity prompted by a rule or schedule (e.g. send a radio message, take a picture).

Broadly, a sensor system is made up of one or more sensors, a processor that handles processing rules, and zero or more communication sensors. Traditionally, the sensor system will use a single low-power processor (e.g. microcontroller). The traditional architecture keeps power consumption low, but because the processor is so limited, it decreases the flexibility and functionality possible for rules.

To provide greater flexibility and functionality possible for rules, the rules are broken across two processors. The rule evaluation is carried out in a low-power processor and actions are executed on the high-power processor. To reduce the programming complexity inherent in programming for two separate devices, the rules may be compiled into an executable modeling language. This modeling language carries nearly equivalent power to typical programming languages (e.g. C, Java, Assembly) but the constraints mean it can more easily fit within the space and processing limitations of the low-power processor.

Figure 1:
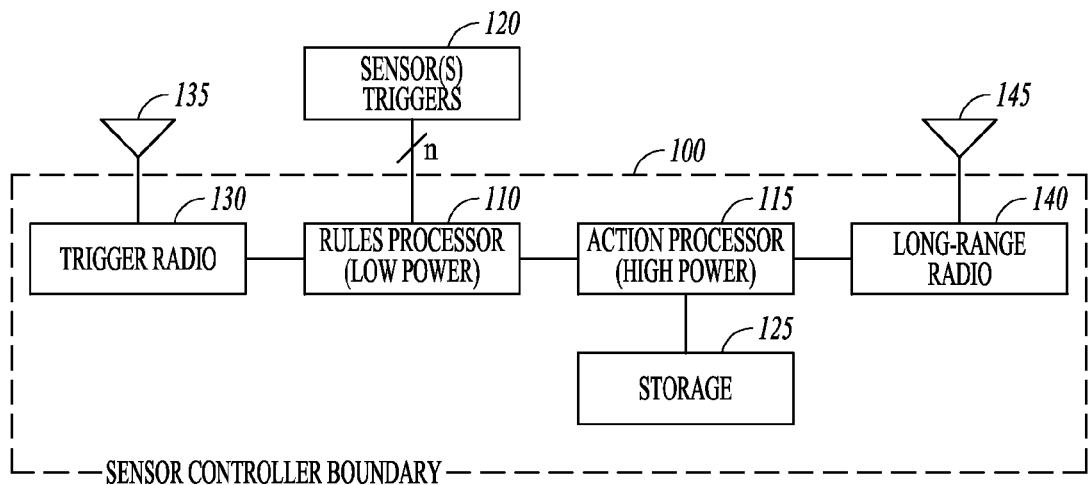
FIG. 1 is a block diagram of a sensor controller having low power and high power processors according to an example embodiment.

FIG. 1 is a block diagram of a simple sensor system 100 with two coupled processors 110 and 115. Processor 110 is a low power processor, such as a typical 8-16 bit microcontroller from Atmel. This type of processor has minimal processing capabilities, enabling it to operate on a low amount of power. Processor 110 is coupled to one or more sensors 120 via a port, such as a serial port. The processor 110 receives data from the sensors 120 representative of sensed parameters, such as flow rates, pressures, temperatures, or any other condition or state that may be sensed. These sensed parameters may be thought of as triggers that are processed according to the rules to determine whether the processor 110 should provide an interrupt to processor 115 to take an action.

The low power processor 110 is programmed with the rules for determining when to wake the higher power processor 115 to take an action responsive to an event. The low power processor 110 thus interprets rules to determine if an action is required by the rules, and sends an interrupt to the high power processor 115. An event, as determined by the rules is usually some change in sensed values that signifies that a control action may be needed, or a change has occurred that would be of interest to an operator.

The high power processor 115 is coupled to a storage device, such as solid state memory, which contains a representation of the actions to be taken depending on the sensor data, and optionally to interpretation of the rules by the low power processor 110. The triggers, sensor data and rules may be further processed by the high power processer to determine an action to take and whether or not to take an action. In some embodiments, the high power processor is an application class processor similar to a cellular phone processor. Different examples include a TI 3530 or ARM Cortex A8 processor. Many different processors capable of processing data to take actions may be used.

In one embodiment, the sensor controller 100 includes a trigger radio 130 that includes an antenna 135 that listens for short messages on a UHS or VHF channel. Messages are sent on to the low power processor 110 for application of the rules and possibly waking of the high power processor 115 for further processing and possible action identification. One action includes use of a long range radio for communicating with a central controller. Sensed values may be communicated to the central controller via the long range radio 140 that includes an antenna 145. Further actions may include adjusting a set point, controlling a valve to increase or decrease a flow rate, controlling gas flow to a heater, or many other actions such as those commonly associated in an industrial control plant or other control, monitoring, or security type environment.

The radios may also be referred to as transceivers, and implement selected protocols to communicate wirelessly. The power levels of such radios are selected to consume a minimal amount of power required to communicate with selected devices. For instance, the trigger radio may be a low power transceiver utilizing lower power protocols such as Zigbee or even shorter range communication protocols. The long range radio 140 may implement an Ethernet protocol or other protocol allowing longer range communications. Various protocols are described in IEEE 802 standards.

Figure 2:
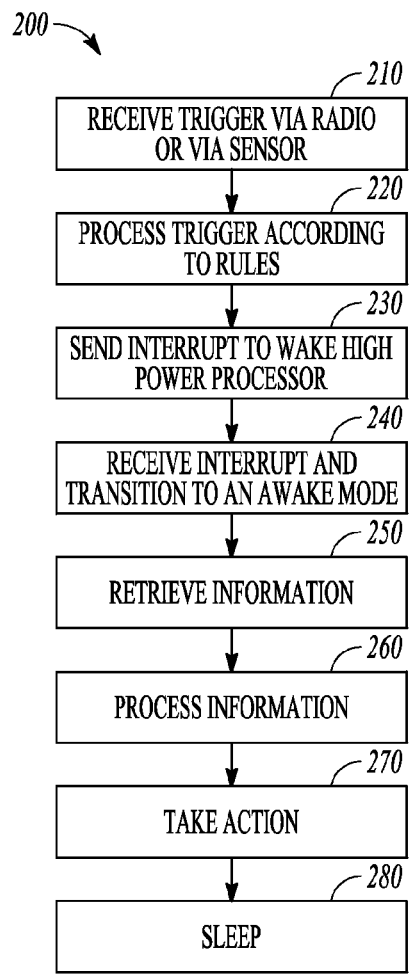
FIG. 2 is a flowchart illustrating a computer implemented method of waking the high power processor when an event occurs according to an example embodiment.

FIG. 2 is a flow diagram illustrating methods 200 performed by the controller 100. At 210, a trigger is received at the low power processor. The trigger may be received via the trigger radio or via one or more sensors. The trigger, or triggers are then processed at 220 in the low power processor using a selected set of rules. The rules may include algorithms for processing one or more triggers to compare values to thresholds. The one or more triggers may include multiple values from a single sensor or values from different sensors. For instance, one rule may specify that if both temperature from sensor T1 and pressure from sensor P1 are greater than selected thresholds, the high power processor should be woken. Another example may simple indicate if one sensor value falls below a threshold, the high power processor should be waked. Still another example includes if three consecutive temperature measurements are above a threshold, or if the differences between consecutive measurements exceed a threshold, the high power processor should be waked. Many other types of rules may be used in further embodiments, with the complexity of the rule limited only by the ability of the low power processor and creativity of the programmer.

If the result of application of the rules is positive, the low power processor sends an interrupt to the high power processor at 230. The interrupt may be a simple message to wake that is received on a monitored port of the high power processor. The high power processor is operating in a low power mode and processing just enough to monitor the port for interrupts. This mode may draw a few nanoamps of power in some embodiments and is commonly referred to as a sleep mode.

At 240, the high power processor receives the wake up interrupt, and changes state to an awake mode, where it is capable of more complex calculations than the lower power processor. The high power processor then retrieves information at 250 sufficient to allow the high power processor to take an appropriate action. The information may be retrieved by communicating with the low power processor to retrieve sensor values and rules interpretations as needed to take the action. The information may be stored in the low power processor memory, or in some instances may be placed in a buffer in any storage accessible directly by both processors, with a pointer or predetermined agreement as to the location of the information.

At 260, the information is processed, and an action may be taken at 270 if the further processing results in a decision to take the action. The action may include controlling an actuator, sending information on to a central controller, changing set points, or many other actions as desired. At 280, the high power processor may return to sleep, awaiting the next interrupt. The interrupt may occur while the processor is awake, and may be queued and processed in a manner selected by the programmer.

Figure 3:
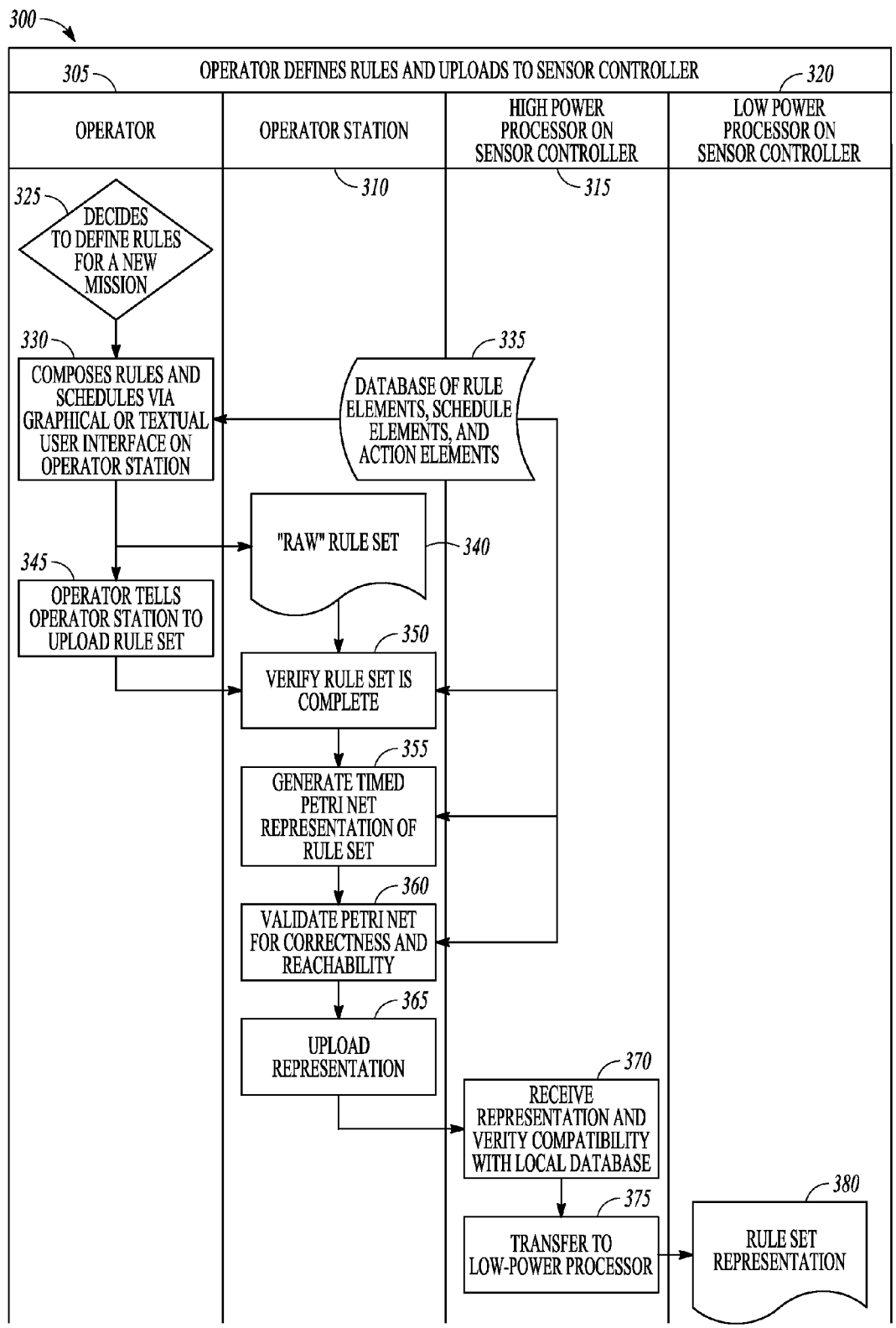
FIG. 3 is a flow diagram illustrating design and implementation of rules for waking the high power processor according to an example embodiment.

FIG. 3 is a representation of a process 300 for defining and uploading rules to a sensor controller. The method is divided into columns with elements performed by an operator or programmer at column 305, elements performed by an operator station at column 310, such as a personal computer or other processing device, elements performed by a high power processor at column 315 on the sensor controller, and elements performed by a low power processor at column 320 on the sensor controller.

At 325, an operator decides to define rules for a new mission. The mission may be associated with adding a new sensor or set of sensors to a process to be controlled. At 330, the operator composes rules and schedules via a graphical or textural user interface on the operator station, drawing from a database of rule elements, schedule elements, and action elements in one embodiment, which may be stored on the operator station. Some elements may also be stored on the high power processor on the sensor controller if desired, and are available to the operator to select via the graphical user interface. A raw rule set 340 is created and stored on the operator station. The operator at 345 may then request the operator station to upload the rule set. The operator station verifies that the rule set is complete at 350, generates a Timed Petri Net representation of the rule set at 355, validates the Timed Petri Net for correctness and reachability at 360, and finally uploads the representation to the high power processor at 365.

The high power processor receives the representation at 370 and verifies compatibility with a local database indicating available sensed data. If the sensed data is available, then the compatibility is assured. Once verified, the representation is transferred at 375 to the low power processor. The low power processor stores the rule set representation at 380 and begins to receive triggers and interpret the rules, waking the processor when the rules indicate to do so. While the representation is captured as a Timed Petri Net in one embodiment, any Type 1 language or other language that can capture time may be used. It should preferably be implementable on a suitable low power processor.

Figure 4:
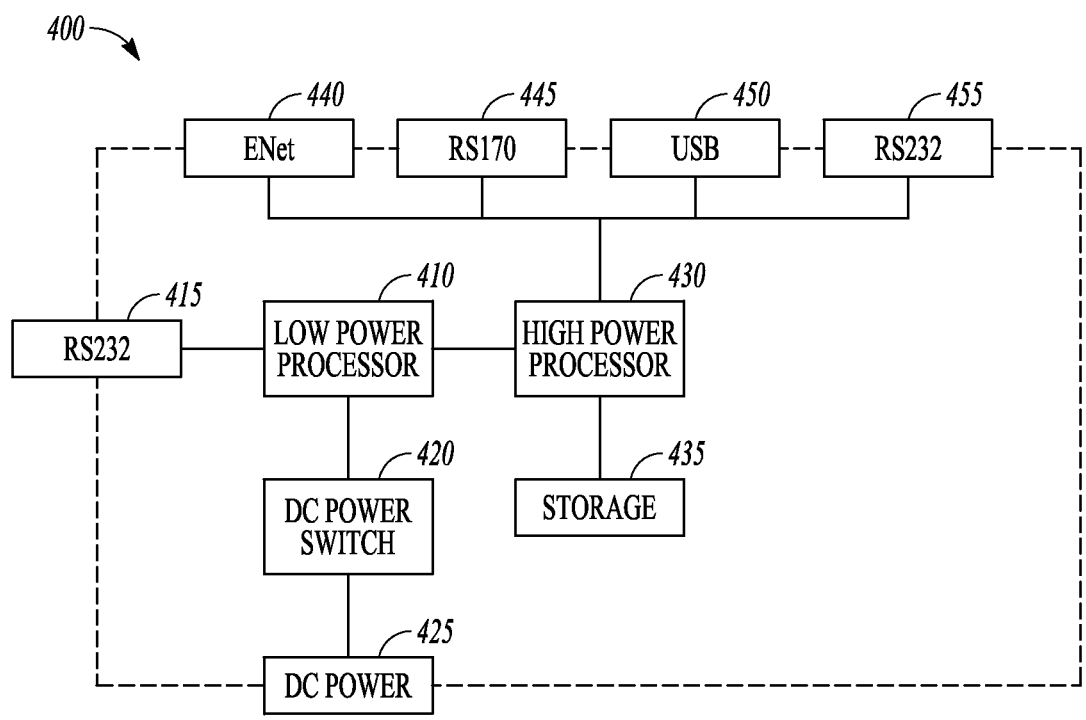
FIG. 4 is a block diagram of an example controller for performing various methods according to an example embodiment.

FIG. 4 is a block diagram of an example controller 400 to implement methods according to an example embodiment showing further details and connections than previously described with respect to system 100. The operator station may be implemented utilizing a personal computer or other computing device such as a tablet or smart phone providing a suitable interface for operator interaction.

Controller 400 includes a low power processor 410 coupled to a bus or port 415, such as an RS232 serial port. The low power processor 410 is also coupled to a DC power switch 420 and DC power source 425, such as a battery or other source of power. The power source 425 may be used to power all elements of controller 400 and in some embodiments, power devices are coupled to the controller 400 via one or more ports, either separately, or as part of standard port combining power and data connections such as a USB port.

High power processor 430 is coupled to the low power processor 410 to receive interrupts when an action may be taken. The high power processor is coupled to a storage device 435, and to one or more busses or ports 440, 445, 450, and 455 to provide connections to sensors, actuators, cameras, and other devices as desired. The ports may include but are not limited to Ethernet ports, RS170 ports, USB ports, and RS232 ports, providing a wide range of abilities to connect to and provide power to devices for carrying out actions.

Storage 435 may be referred to as simply the memory, and, in some embodiments, includes read-only memory (ROM) and random-access memory (RAM). Further memory devices may be coupled via one or more of the ports. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in various embodiments.

Programming for implementing one or more processes or methods described herein may be resident on any one or number of these computer-readable media.

In various embodiments, when high power processor 430 takes an action, it may send a signal over one of the busses to a device, such as a camera to take an action. In the case of a camera, the action may be to take a picture or record a video. The device sends the results of the action back to the high power processor 430, which may then turn off power to the device if supplied via the bus. The high power processor 430 may further process the results and take another action, such as forwarding information or analysis to a central controller or simply store the information for later use.

EXAMPLES

1. A controller comprising:
a low power processor to couple to a sensor, the low power processor configured to receive data from the sensor and apply rules to the received data and provide an interrupt in accordance with the applied rules;
a high power processor coupled to receive interrupts from the low power processor in a sleep mode, to wake upon receipt of the interrupt, and to receive and process the data to determine actions to take based on the data, wherein the high power processor initiates the actions.

2. The controller of example 1 wherein the low power processor is configured coupled to multiple sensors.

3. The controller of any of examples 1-2 wherein the low power processor is coupled to receive messages from a transceiver and apply rules to such messages.

4. The controller of any of examples 1-3 and further comprising a long range transceiver coupled to the high power processor, wherein actions include sending a message via a long range transceiver.

5. The controller of example 4 wherein actions include causing a picture to be taken.

6. The controller of any of examples 1-5 wherein the rules are represented in an executable modeling language stored on a computer readable storage device.

7. The controller of example 6 wherein the rules are evaluated by the low power processor and actions specified by the rules are executed on the high power processor.

8. The controller of example 7 wherein the rules are represented as a Timed Petri Net.

9. The controller of any of examples 1-8 wherein the low power processor is a microcontroller, and wherein the high power processor draws less power in a sleep mode than in an awake mode.

10. A method comprising:
receiving triggers at a low power processor in a sensor controller;
applying rules via the low power processor to the triggers to determine whether or not to wake a sleeping high power processor;
receiving an interrupt from the low power processor at a high power processor in the sensor controller, the interrupt being sent in accordance with the rules; and
taking an action in accordance with the rules via the high power processor, wherein the high power processor wakes upon receipt of the interrupt and further processes the rules to take the action.

11. The method of example 10 wherein the action includes sending a message via a transceiver.

12. The method of any of examples 10-11 wherein the low power processor wherein the triggers comprise sensor measurements from a sensor.

13. The method of any of examples 10-12 wherein the rules are represented in an executable modeling language stored on a computer readable storage device.

14. The method of example 13 wherein the rules are evaluated by the low power processor and actions specified by the rules are executed on the high power processor.

15. The method of example 14 wherein the rules are represented as a Timed Petri Net.

16. The method of any of examples 10-15 wherein the low power processor is a microcontroller, and wherein the high power processor draws less power in a sleep mode than in an awake mode.

17. A computer readable storage device having instructions for causing a computer to execute a method, the method comprising:
receiving triggers at a low power processor in a sensor controller;
applying rules via the low power processor to the triggers to determine whether or not to wake a sleeping high power processor;
receiving an interrupt from the low power processor at a high power processor in the sensor controller, the interrupt being sent in accordance with the rules; and
taking an action in accordance with the rules via the high power processor, wherein the high power processor wakes upon receipt of the interrupt and further processes the rules to take the action.

18. The computer readable storage device of example 17 wherein the action includes sending a message via a transceiver.

19 The computer readable storage device of any of examples 17-18 wherein the rules are represented as a Timed Petri Net.

20. The computer readable storage device of example 19 wherein the rules are evaluated by the low power processor and actions specified by the rules are executed on the high power processor.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A controller comprising:
a low power processor to couple to a sensor, the low power processor programmed to receive data from the sensor and apply rules represented in an executable modeling language to the received data and provide an interrupt in accordance with the applied rules;
a high power processor coupled to receive interrupts from the low power processor in a sleep mode, to wake upon receipt of the interrupt, and to receive and process the data to determine actions to take based on the data, wherein the high power processor initiates the actions.

2. The controller of claim 1 wherein the low power processor is coupled to multiple sensors.

3. The controller of claim 1 wherein the low power processor is coupled to receive messages from a transceiver and apply rules to such messages.

4. The controller of claim 1 and further comprising a long range transceiver coupled to the high power processor, wherein actions include sending a message via a long range transceiver.

5. The controller of claim 4 wherein actions include causing a picture to be taken.

6. The controller of claim 1 wherein the low power processor has minimal processing capabilities enabling the low power processor to operate on a low amount of power and wherein the rules represented in the executable modeling language are stored on a computer readable storage device.

7. The controller of claim 6 wherein the rules are evaluated by the low power processor and actions specified by the rules are executed on the high power processor.

8. The controller of claim 7 wherein the rules are represented as a Timed Petri Net.

9. The controller of claim 1 wherein the low power processor is a microcontroller, and wherein the high power processor draws less power in a sleep mode than in an awake mode.

10. A method comprising:
receiving triggers at a low power processor in a sensor controller;
applying rules represented in an executable modeling language via the low power processor to the triggers to determine whether or not to wake a sleeping high power processor;
receiving an interrupt from the low power processor at a high power processor in the sensor controller, the interrupt being sent in accordance with the rules; and
taking an action in accordance with the rules via the high power processor, wherein the high power processor wakes upon receipt of the interrupt and further processes the rules to take the action.

11. The method of claim 10 wherein the action includes sending a message via a transceiver.

12. The method of claim 10 wherein the triggers comprise sensor measurements from a sensor.

13. The method of claim 10 wherein the rules represented in the executable modeling language are compiled and stored on a computer readable storage device.

14. The method of claim 13 wherein the rules are evaluated by the low power processor and actions specified by the rules are executed on the high power processor.

15. The method of claim 14 wherein the rules are represented as a Timed Petri Net.

16. The method of claim 10 wherein the low power processor is a microcontroller, and wherein the high power processor draws less power in a sleep mode than in an awake mode.

17. A computer readable storage device having instructions for causing a computer to execute a method, the method comprising:
receiving triggers at a low power processor in a sensor controller;
applying rules represented in an executable modeling language via the low power processor to the triggers to determine whether or not to wake a sleeping high power processor;
receiving an interrupt from the low power processor at a high power processor in the sensor controller, the interrupt being sent in accordance with the rules; and
taking an action in accordance with the rules via the high power processor, wherein the high power processor wakes upon receipt of the interrupt and further processes the rules to take the action.

18. The computer readable storage device of claim 17 wherein the action includes sending a message via a transceiver.

19. The computer readable storage device of claim 17 wherein the rules are represented as a Timed Petri Net.

20. The computer readable storage device of claim 19 wherein the rules are evaluated by the low power processor and actions specified by the rules are executed on the high power processor.

* * * * *